United States Patent
Bodhaine

[11] Patent Number: 5,699,822
[45] Date of Patent: Dec. 23, 1997

[54] BREAKAWAY COUPLING DEVICE

[75] Inventor: James Bodhaine, Houston, Tex.

[73] Assignee: Vita International, Inc., Houston, Tex.

[21] Appl. No.: 643,370

[22] Filed: May 6, 1996

[51] Int. Cl.$^6$ ............................................. F16L 29/00
[52] U.S. Cl. ........................... 137/68.15; 137/614.04; 285/77
[58] Field of Search ....................... 137/68.15, 614.04; 285/77

[56] References Cited

U.S. PATENT DOCUMENTS

| | | | |
|---|---|---|---|
| 2,896,977 | 7/1959 | Hansen | 137/614.04 |
| 2,921,436 | 1/1960 | Canner | 137/614.04 |
| 3,285,628 | 11/1966 | Vries | 285/27 |
| 4,444,223 | 4/1984 | Maldavs | 137/614.04 |
| 4,449,545 | 5/1984 | Vernor et al. | 137/68.15 |
| 4,614,201 | 9/1986 | King et al. | 137/68.15 |
| 4,646,773 | 3/1987 | Klop et al. | 137/68.15 |
| 4,763,683 | 8/1988 | Carmack | 137/68.15 |
| 4,896,688 | 1/1990 | Richards et al. | 137/68.15 |
| 4,905,733 | 3/1990 | Carow | 137/614.04 |
| 4,982,736 | 1/1991 | Schneider | 137/614.04 |
| 5,027,855 | 7/1991 | Jaggi | 137/614.04 |
| 5,355,908 | 10/1994 | Berger et al. | 137/614.04 |

*Primary Examiner*—Denise L. Ferensic
*Assistant Examiner*—Joanne Kim
*Attorney, Agent, or Firm*—Wendy K. Buskop; Chamberlain Hrdlicka et al.

[57] ABSTRACT

A breakaway coupling device is provided having a male and female valve body. The female valve body, a plurality of boltholes extending therethrough, and a plurality of boreholes extending therethrough. The female valve body further defines a first cavity traversing the female valve body. The male valve body has a plurality of flange pairs and a plurality of boreholes aligned with the boreholes in the female valve body. There are a plurality of tie bolts attached to the female valve body through the plurality of boltholes. The tie bolts are received by the plurality of tinge pairs on the male valve body. There are a plurality of shear pins. Each one of the plurality of shear pins intersects each flange pair and each one of the plurality of tie bolts at an angle perpendicular to the tie bolts thereby connecting the male valve body to the female valve body. There are plurality of guide pins closely received by the boreholes in the male valve body and the female valve body. A method for disconnecting a hydraulic disconnect is also provided.

12 Claims, 5 Drawing Sheets

BREAKAWAY COUPLING DEVICE

BACKGROUND OF THE INVENTION

The present invention relates to a breakaway coupling device. More specifically, the invention relates to a breakaway coupling device designed for remote or manual separation in any situation.

Offshore production operations require vessels to deliver and retrieve different fluids required in the course of production. These fluids pass through flexible pipe designed to carry fluids under high pressure. Water, oil, acid and sand are some of the fluids pumped through these pipes depending on the type of work being done.

The operation of these offshore facilities are subject to several emergency conditions. Under certain circumstances, a vessel may have to leave quickly due to a fire or hazardous conditions occurring on the vessel or the production rig. For example, when fluids are withdrawn from the site, they are frequently burned off, this presents a potentially dangerous situation if the fire gets out of control, making it necessary to quickly move the service vessel out of danger. These types of emergencies can occur instantly, giving no warning and leaving very little time to disconnect the service vessel and move it to a safe location. A service unit that can be quickly and easily removed from the riser would be highly desirable and cost effective.

Toward minimizing the time consumed to detach the vessel, and to minimize the amount of potentially toxic material exposed to the environment, the present invention provides a system wherein a production vessel is equipped with a breakaway coupling device that can be remotely or manually operated and releases a minimal amount of fluid upon disconnection.

It is an object of the present invention to provide a breakaway coupling device that can be separated remotely with minimal fluid loss.

It is a further object of the present invention to provide a breakaway coupling device that can be separated manually with minimal fluid loss.

SUMMARY OF THE INVENTION

In one embodiment of the present invention there is provided, a breakaway coupling device. The breakaway coupling device comprises a male and female valve body. The female valve body, a plurality of boltholes extending therethrough, and a plurality of boreholes extending therethrough. The female valve body further defines a first cavity traversing the female valve body. The male valve body has a plurality of flange pairs and a plurality of boreholes aligned with the boreholes in the female valve body. There are a plurality of tie bolts attached to the female valve body through the plurality of boltholes. The tie bolts are received by the plurality of flange pairs on the male valve body. There are a plurality of shear pins. Each one of the plurality of shear pins intersects each flange pair and each one of the plurality of tie bolts at an angle perpendicular to the tie bolts thereby connecting the male valve body to the female valve body. There are plurality of guide pins closely received by the boreholes in the male valve body and the female valve body.

The male valve body further defines a second cavity traversing the male valve. The first cavity and the second cavity are aligned with one another so as to form a path through the breakaway coupling device. A check valve is positioned within the first cavity and the second cavity. There is also a channel defined by the female valve body.

In another embodiment of the present invention, there is provided a method for separating a breakaway coupling device. The method comprises providing a coupling device having male valve body and a female valve body being complementary to the male valve body. The male and female valve bodies form a cavity for receiving a check valve. The female valve body further defines a hydraulic port. A check valve is provided for stopping fluid flow when the two valve bodies are separated. The male valve body and the female valve body are aligned using guide pins that intersect the male valve body and the female valve body. The male valve body is attached to the female valve body using tie bolts as described previously. Shear pins are positioned through the tie bolts to hold the bolts on the male valve body. The male valve body is separated from the female valve body and the check valve is engaged so that fluid flow is stopped.

DETAILED DESCRIPTION OF THE PREFERRED EMBODIMENTS

Figure 1:
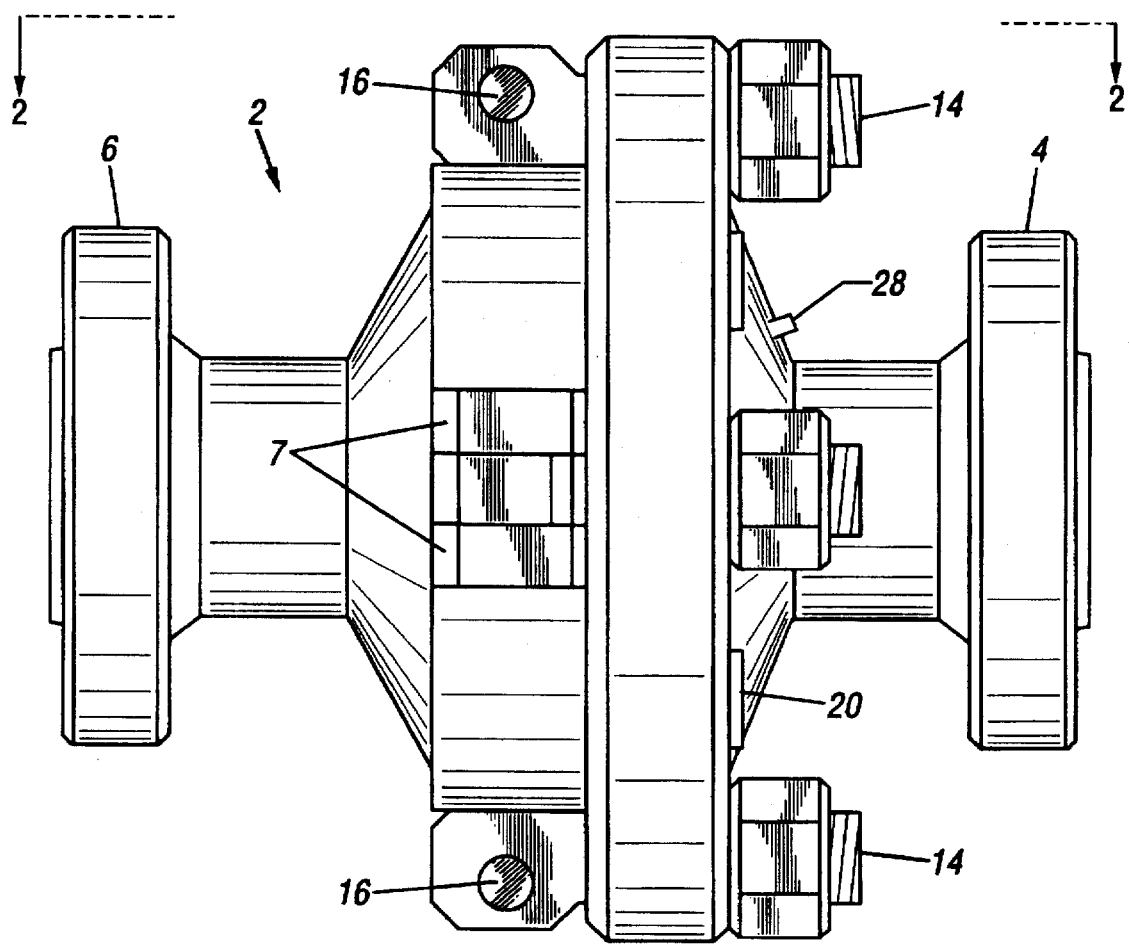
FIG. 1 is a pictorial view of the breakaway coupling device.
Figure 2:
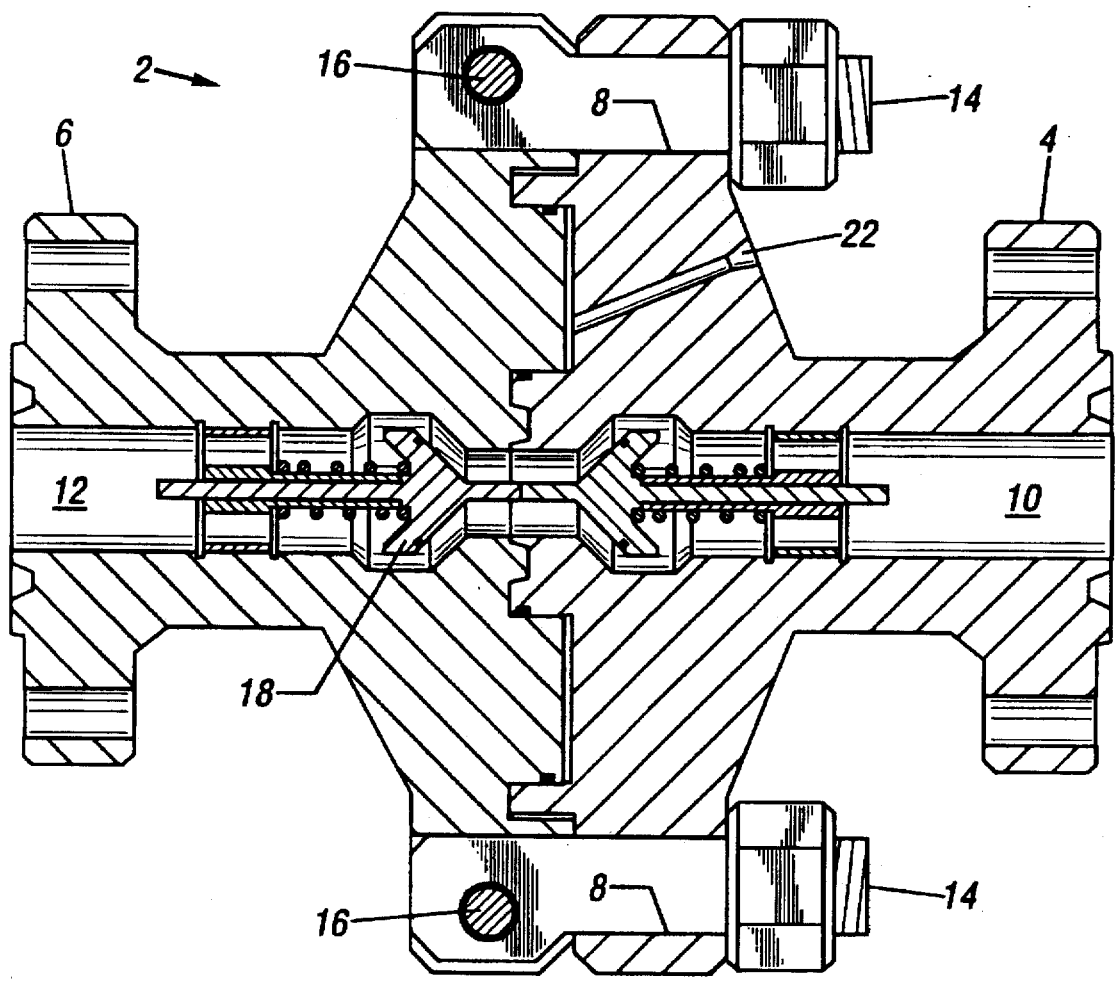
FIG. 2 is a cross-sectional view of the breakaway coupling device along lines 2—2.
Figure 3:
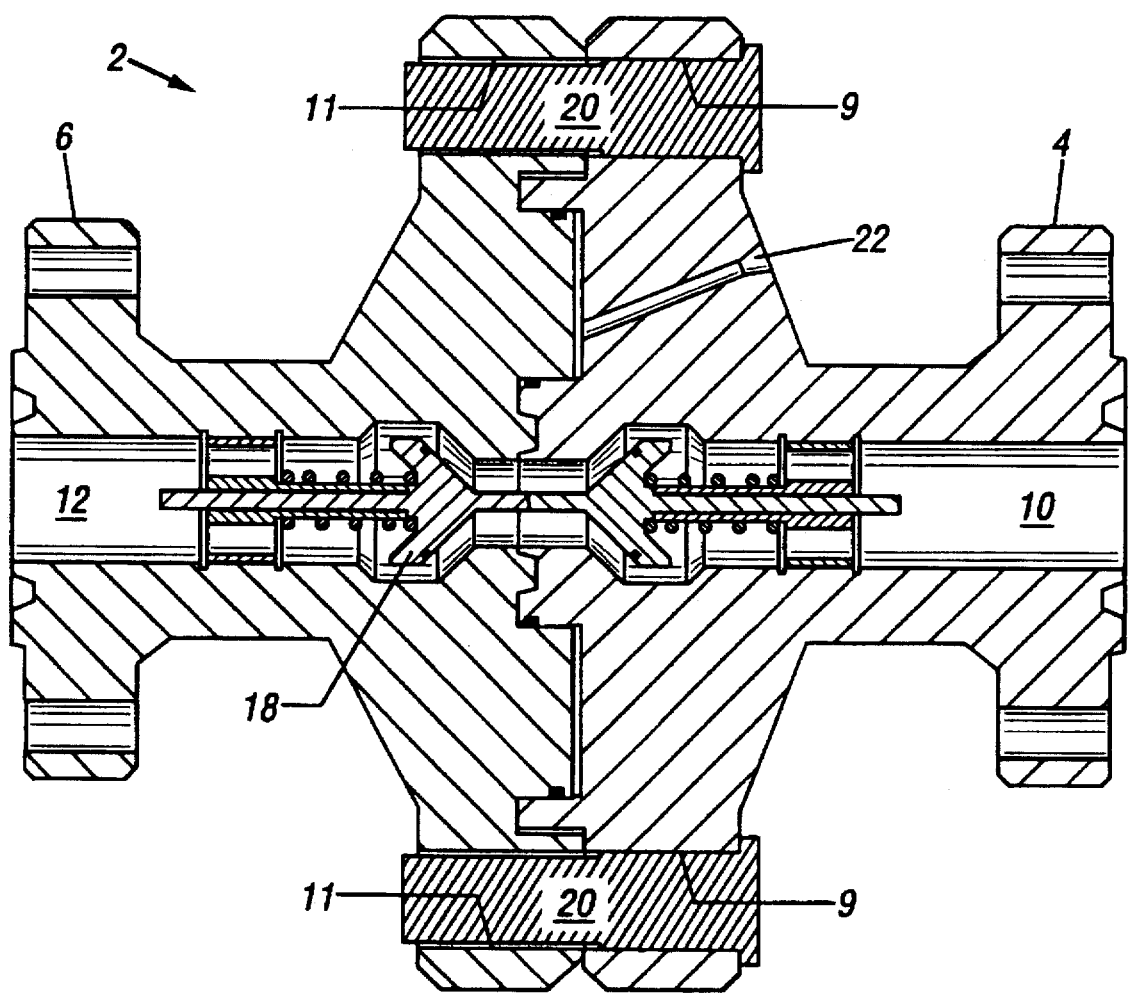
FIG. 3 is a cross-sectional view of the breakaway coupling device showing the guide pins.
Figure 4:
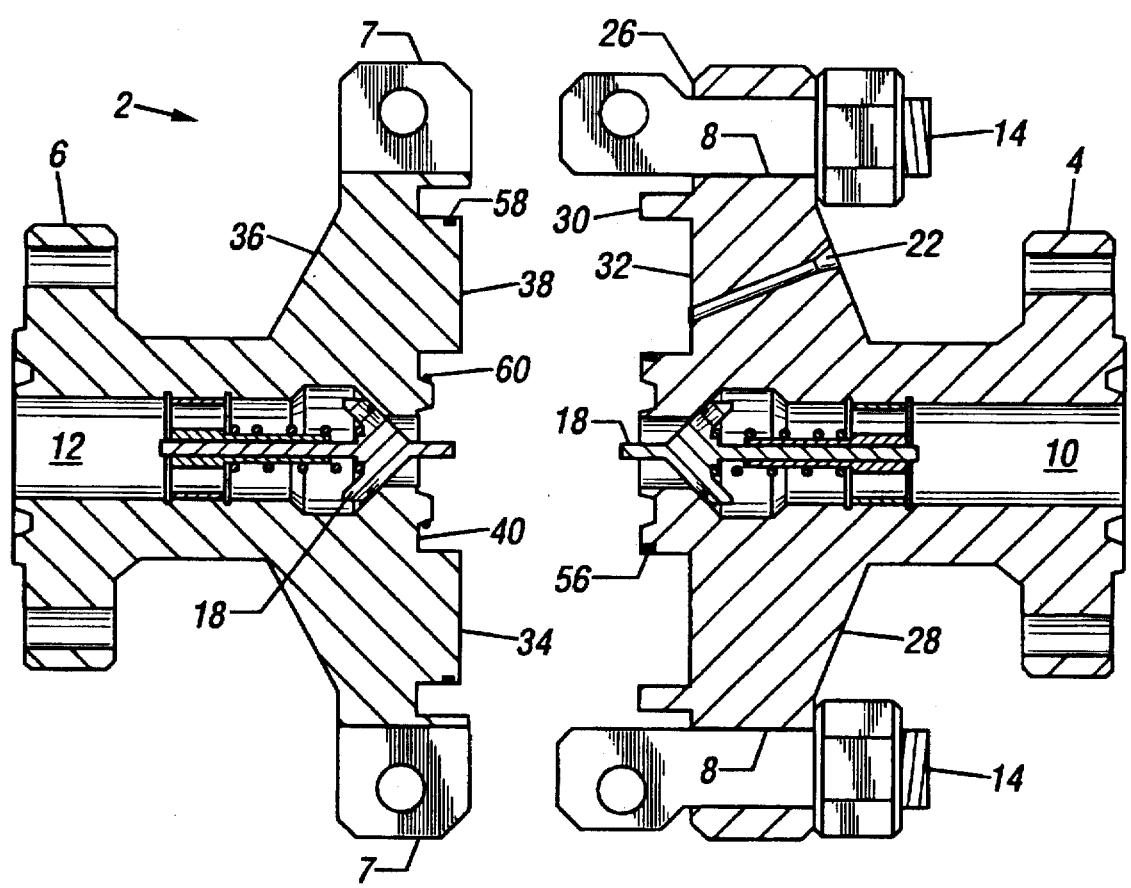
FIG. 4 is a cross-sectional view of the breakaway coupling device after separation.
Figure 5:
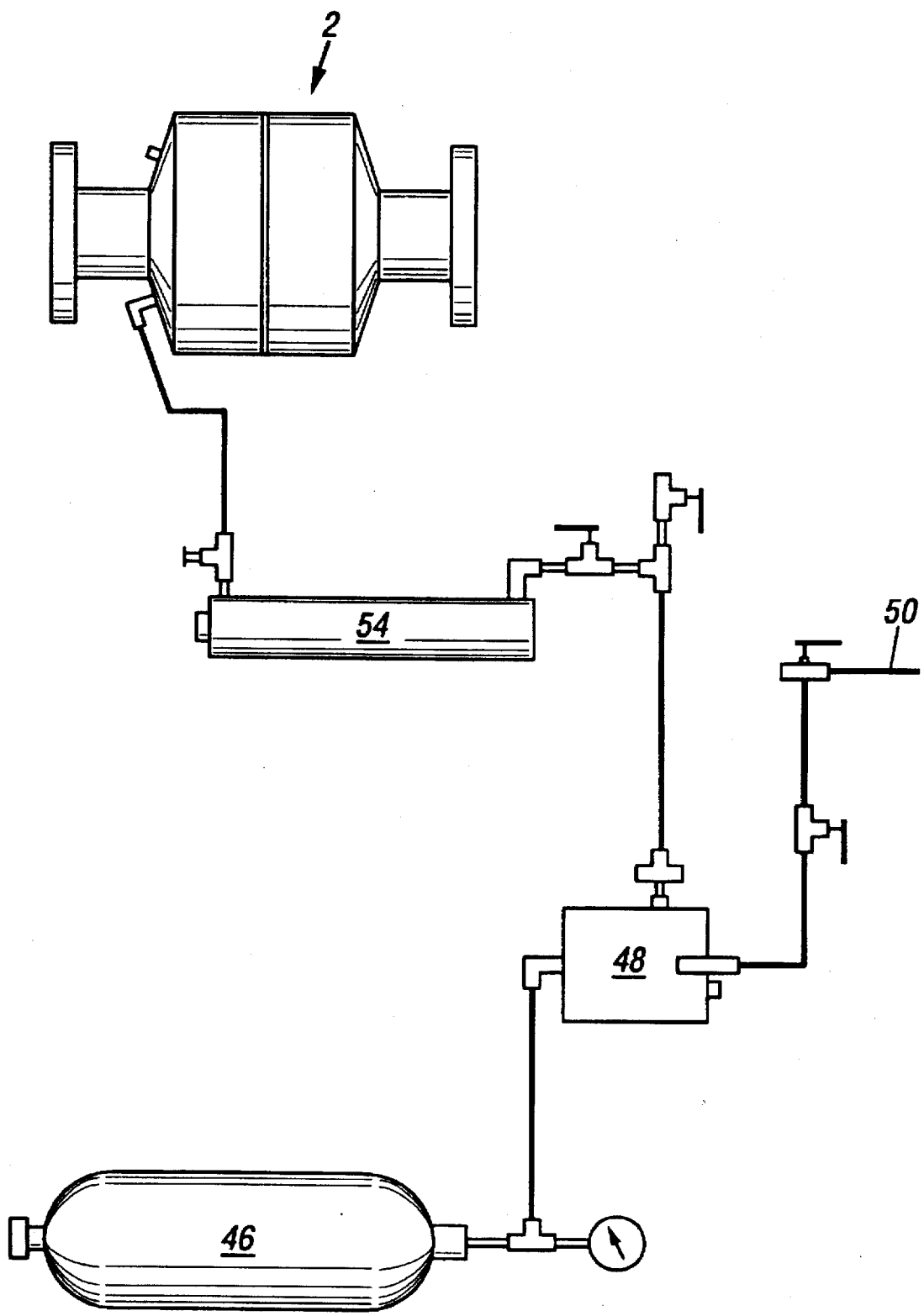
FIG. 5 is a schematic diagram of the hydraulic control system.

In one embodiment of the present invention there is provided, a breakaway coupling device 2 as illustrated by FIG. 1. The breakaway coupling device 2 comprises a male valve body 6 and female valve body 4. The female valve body 4 has, a plurality of boltholes 8 extending therethrough, and a plurality of boreholes 9 extending therethrough as shown in FIG. 2 and 3 The female valve body 4 further defines a first cavity 10 traversing the female valve body 4. The male valve body 6 has a plurality of flange pairs 7, and a plurality of boreholes 11 aligned with the boreholes 9 in the female valve body 4. There are a plurality of tie bolts 14 attached to the female valve body 4 through the plurality of boltholes 8. The tie bolts 14 are received by the plurality of flange pairs 7 on the male valve body 6. There are a plurality of shear pins 16. Each one of the plurality of shear pins 16 intersects each flange pair and each one of the plurality of tie bolts 14 at an angle perpendicular to the tie bolts 14 thereby connecting the male valve body 6 to the female valve body 4. There are plurality of guide pins 20 closely received by the boreholes 11 in the male valve body 6 and the female valve body 4. Preferably, the guide pins 20 are covered by a Teflon® sleeve.

The male valve body 6 further defines a second cavity 12 traversing the male valve body 6. The first cavity 10 and the second cavity 12 are aligned with one another so as to form a flow path through the breakaway coupling device 2. Flexible tubing is attached to each valve body and fluids flow through the first cavity 10 and the second cavity 12. A check valve 18 is positioned within the fast cavity and the second cavity. There is also a channel 22 traversing the female valve body 4.

The female valve body 4 preferably has an inner surface 26 and an outer surface 28. The inner surface 26 forms ridges 30 and grooves 32 extending radially about the female valve body 4. The channel 22 extends from the outer surface 28 to the inner surface 26 of the female valve body 4. The male valve body 6 likewise, has an inner surface 34 and outer surface 36. The inner surface 34 forms ridges 38 and grooves 40 extending radially about the male valve body 6 that complement the ridges 30 and grooves 32 formed by the inner surface 26 of the female valve body 4 so that when the male valve body 6 is connected to the female valve body 4 the respective inner surfaces are in intimate contact with one another. Preferably, there is a first o-ring 56 attached to the inner surface 26 of the female body, a second o-ring 58 attached to the inner surface 34 of the male valve body 6, and a third o-ring 60 attached to the inner surface 34 of the male valve body 6. These o-rings extend radially about the respective valve bodies and form a seal so that when the two valve bodies are separated little to no fluid is lost until the check valve is fully engaged.

The check valve 18 can be any one of several types. A dual flapper valve, a ball valve or a check valve like the one shown in the figures. The check valve shown is patented by Hiltap Fittings, Inc. located in Canada. The function of the check valve is to seal the opening to each cavity so that very little pumped fluid is released when the coupling device is separated. The total pumped fluid lost upon separation is approximately 120 cc. The total amount of hydraulic fluid lost upon separation is approximately one quart. The hydraulic fluid used to separate the breakaway coupling device is food grade oil thereby posing no threat to the environment.

The plurality of shear pins 16 can be made from a polymer having a tensile strength of approximately 22,000 pounds per square inch. The shear value of the shear pins 16 is approximately 11,000 pounds per square inch. The shear pins 16 can be made from a member of the group comprising polypropylene, polyurethane, nylon, or mixtures thereof. Torlon® 5030 is an example of such a polymer. Torlon® has a tensile strength of 22,850 pounds per square inch and a shear value of 11,000 pounds. Torlon® may be obtained from Cadillac Plastic of Houston, Tex. Torlon® is registered trademark of Amoco Chemicals Corporation.

The means 24 for disconnecting the male valve body 6 from the female valve body 4 preferably, comprises a control system. The control system has an accumulator 46 precharged with nitrogen, a pneumatic poppit valve 48 connected to the accumulator 46, a manually controlled air supply 50 being connected to the poppit pneumatic valve 48, a hydraulic pump 45 that charges the accumulator 46 with oil, and a hydraulic cylinder 54 that is activated by the accumulator 46. Alternatively, the breakaway coupling device 2 can be separated manually by applying approximately 88,000 pounds of force to the device. The accumulator is pressurized with approximately 800 pounds of nitrogen and approximately 3,000 pounds of oil.

In another embodiment of the present invention, there is provided a method for separating a breakaway coupling device 2. The method comprises providing a coupling device 2 having male valve body 6 and a female valve body 4 being complementary to the male valve body 6. The male and female valve bodies form a cavity for receiving a check valve 18. The female valve body 4 further defines a hydraulic port or channel 22 as described above. A check valve 18 is provided for stopping fluid flow when the two valve bodies are separated. The male valve body 6 and the female valve body 4 are aligned using guide pins 20 that intersect the male valve body 6 and the female valve body 4. The male valve body 6 is attached to the female valve body 4 using tie bolts 14 as described previously. Shear pins 16 are positioned through the tie bolts 14 to hold the bolts on the male valve body 6. The male valve body 6 is separated from the female valve body 4 and the check valve 18 is engaged so that fluid flow is stopped in both directions. During separation, the female valve body 4 and the male valve body 6 maintain a seal against pressurized fluids until the check valve 18 is sealed. The seal is maintained by the o-rings as described previously.

The step of separating includes injecting hydraulic fluid between the male and female valve bodies via a controller. The controller comprises an accumulator 46 precharged with nitrogen, a pneumatic poppit valve 48 connected to the accumulator, a manually controlled air supply 50 connected to the pneumatic poppit valve, a hydraulic pump 45 that charges the accumulator 46 with oil, and a hydraulic cylinder 54 that is activated by the accumulator as described previously. Alternatively, the step of separating comprises manually applying 88,000 pounds of force to the female valve body 4 to separate the female valve body 4 from the male valve body 6.

The pneumatic poppit valve 48 is actuated so that oil is released from the accumulator, activating the hydraulic cylinder with the oil released from the accumulator so that a measured volume of pressurized oil is delivered to the hydraulic port to separate the male valve body 6 from the female valve body 4. Preferably, oil is delivered to the hydraulic port at a pressure of from about 1800 to 1900 pounds per square inch.

The breakaway coupling device 2 described herein is designed to be used with high pressure hoses. The coupling device 2 has a maximum working pressure of 10,000 pounds per square inch and will withstand pressures of up to 15,000 pounds per square inch.

Although the present invention has been characterized in terms of the above-described presently preferred embodiment, it will be recognized by those skilled in the art who have the benefit of this disclosure that certain changes and variations may be made to that embodiment without departing from the spirit of the present invention. The present invention is not limited to the above-described presently preferred embodiment, and it is expected that such variations will be encompassed within the scope of the following claims.

I claim:

1. A breakaway coupling device comprising:
   a female valve body, a plurality of boltholes extending therethrough, and a plurality of boreholes extending therethrough, wherein said female valve body further defines a first cavity traversing the female valve body;
   a male valve body, a plurality of flange pairs, and a plurality of boreholes aligned with the boreholes in the female valve body, wherein said male valve body further defines a second cavity traversing the male valve body;
   a plurality of tie bolts being attached to said female valve body through said plurality of boltholes, wherein said tie bolts are received by said plurality of flange pairs on said male valve body;
   a plurality of shear pins, wherein each one of said plurality of shear pin, intersects each flange pair and each one of said plurality of tie bolts at an angle perpendicular to said tie bolts thereby connecting said male valve body to said female valve body;
   a check valve being received by the first cavity and the second cavity;
   a plurality of guide pins closely received by the boreholes in the male valve body and the female valve body; and a channel being defined by said female valve body;

wherein the guide pins are covered by a Teflon® sleeve.

2. The breakaway coupling device of claim 1, further comprising a means for separating said female valve body from said male valve body, wherein said means for separating said female valve body from said male valve body is connected to said channel.

3. The breakaway coupling device of claim 1, wherein said female valve body has an inner surface and an outer surface; said inner surface forming ridges and grooves, and said channel extends from the outer surface to the inner surface of said female body.

4. The breakaway coupling device of claim 3, wherein said male valve body has an inner surface and outer surface; said inner surface forming ridges and grooves that complement the ridges and grooves formed by the inner surface of the female body so that when the male valve body is connected to the female valve body the respective inner surfaces are in intimate contact with one another.

5. The breakaway coupling device of claim 1, wherein said check valve is a dual flapper valve.

6. The breakaway coupling device of claim 1, wherein said check valve is a ball valve.

7. The breakaway coupling device of claim 1, wherein the check valve is a double check valve.

8. The breakaway coupling device of claim 1, wherein said plurality of shear pins are made from a polymer having a tensile strength of approximately 22,000 pounds per square inch and a shear value of approximately 11,000 pounds per square inch.

9. The breakaway coupling device of claim 8, wherein said plurality of shear pins are made from a material selected from the group consisting of polypropylene, polyurethane, nylon, and a mixture of any two or more thereof.

10. The breakaway coupling device of claim 8, wherein the shear pins are made of Torlon®.

11. The breakaway coupling device of claim 1, wherein the means for disconnecting said male valve body from said female valve body comprises a control system having an accumulator precharged with nitrogen, a pneumatic poppit valve connected to the accumulator, a manually controlled air supply being connected to the pneumatic poppit valve, a hydraulic pump that charges the accumulator with oil, and a hydraulic cylinder that is activated by the accumulator.

12. The breakaway coupling device of claim 11, wherein the cylinder is actuated by a control system having an accumulator precharged with nitrogen, a pneumatic poppit valve connected to the accumulator, a manually controlled air supply being connected to the pneumatic poppit valve, a hydraulic pump that charges the accumulator with oil, and a hydraulic cylinder that is activated by the accumulator.

* * * * *